J. B. RYDER.
Stalk-Chopper.

No. 48,312.

Patented June 20, 1865.

Witnesses:
J. W. Edwards
& h. Sprague

Inventor:
John B. Ryder

UNITED STATES PATENT OFFICE.

JOHN B. RYDER, OF WAPELLO, IOWA.

IMPROVEMENT IN MACHINES FOR CUTTING STALKS.

Specification forming part of Letters Patent No. 48,312, dated June 20, 1865.

*To all whom it may concern:*

Be it known that I, J. B. RYDER, of the city of Wapello, county of Louisa, and State of Iowa, have invented a new and useful Improvement on a Machine or Field Roller for Cutting Stalks and Weeds; and I do hereby declare that the following is a full, clear, and exact description of the construction and operation of the same, reference being had to the annexed drawings, making a part of this specification, in which—

Figure 1:
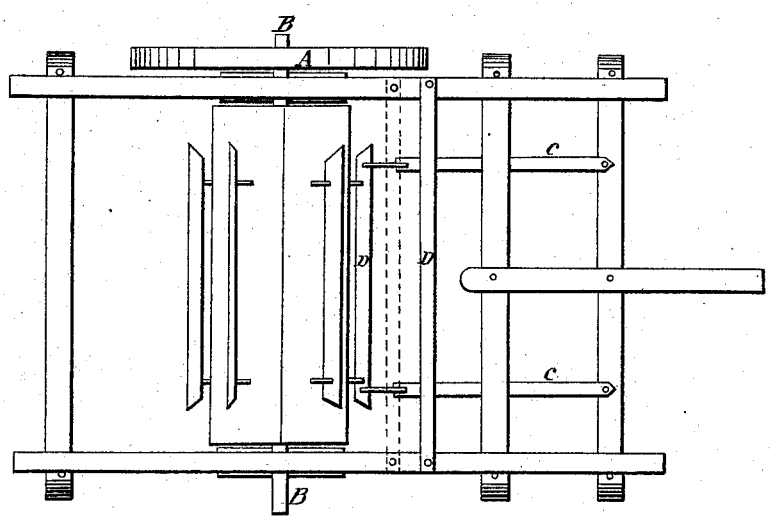
Figure 4:
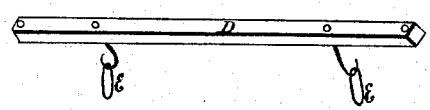
Figure 3:
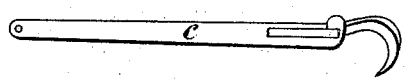
Figure 2:
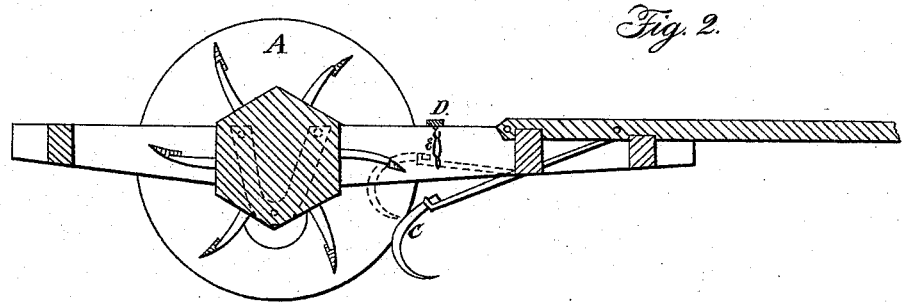

Figure 1 is a perspective view; Fig. 2, a longitudinal elevation. Fig. 3 represents one of the springs and sickel-shaped hook or stalk-gatherer. Fig. 4 represents an adjustable cross-bar to prevent the cutters or knives from revolving, when desirable, and the staples and links or fastenings for sustaining the springs when elevated to clear the ground.

I disclaim the invention of the field roller or machine as originally constructed by other inventors and now in use, and which consists of a simple frame-work mounted on pivots projecting from the ends of a common round, hexagonal, or octagonal shaped roller, to which knives or cutters of various shapes are attached for the purpose of cutting stalks or weeds from the roots or into pieces by the revolving of the roller when the machine is in motion, and which is moved by ordinary horse-power. Some of these machines have wheels of various sizes attached for the purpose of preventing the cutters from running too deep or for driving other machinery connected therewith. These are also disclaimed.

My improvement is the addition to a machine constructed as above of the long journals B B in the roller, and the attachment thereto of an extra set of larger wheels, A A, Figs. 1 and 2, to raise the machine from the ground, balancing it so that it is moved with greater ease and facility from field to field; also, an adjustable cross-bar, D, Figs. 1, 2, and 4, so fixed to the frame-work as to prevent the cutters from rolling when moving from place to place, and to which is attached the staples and links or fastenings E E for sustaining the springs C C, Fig. 1, when elevated from the ground; also, the addition of the broad springs, as shown in Figs. 1, 2, and 3, attached to the frame in front of the cutters, which so adjust themselves to the ground as to prevent a side or lateral motion when gathering stalks or weeds in proper shape or direction to be cut by the knives or cutters; also, the sharpened sickle-shaped hooks or attachments to the springs C C, which act as gatherers or straighteners of such stalks or weeds as are not in proper line to be cut.

What I claim as my improvement, and desire to secure by Letters Patent, is—

The long journals B B, the extra wheels A A, the broad springs C C, with their sickel-shaped hooks, the adjustable cross-bar D, and links E, when these several parts are arranged and combined with the main roller armed with cutters, the whole operating conjointly, as and for the purpose specified.

JOHN B. RYDER.

Witnesses:
J. M. EDWARDS,
JAMES S. HURLEY.